US010531112B2

(12) United States Patent
Takayama

(10) Patent No.: US 10,531,112 B2
(45) Date of Patent: Jan. 7, 2020

(54) SIGNAL PROCESSING APPARATUS, IMAGING APPARATUS, AND SIGNAL PROCESSING METHOD TO REDUCE ELECTRIC POWER REQUIRED FOR SIGNAL PROCESSING

(71) Applicant: SONY SEMICONDUCTOR SOLUTIONS CORPORATION, Kanagawa (JP)

(72) Inventor: Katsumi Takayama, Saitama (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 180 days.

(21) Appl. No.: 15/511,041

(22) PCT Filed: Jul. 16, 2015

(86) PCT No.: PCT/JP2015/070342
§ 371 (c)(1),
(2) Date: Mar. 14, 2017

(87) PCT Pub. No.: WO2016/047250
PCT Pub. Date: Mar. 31, 2016

(65) Prior Publication Data
US 2017/0280154 A1    Sep. 28, 2017

(30) Foreign Application Priority Data

Sep. 25, 2014   (JP) .................................. 2014-194991

(51) Int. Cl.
*H04N 19/52* (2014.01)
*H04N 19/105* (2014.01)
(Continued)

(52) U.S. Cl.
CPC ........... *H04N 19/52* (2014.11); *H04N 19/105* (2014.11); *H04N 19/61* (2014.11); *G08B 13/19602* (2013.01); *H04N 7/18* (2013.01)

(58) Field of Classification Search
CPC .... H04N 19/537; H04N 19/54; H04N 19/543; H04N 19/139; H04N 19/176; H04N 19/105; H04N 19/52; H04N 19/61
See application file for complete search history.

(56) References Cited

U.S. PATENT DOCUMENTS 5,598,483 A * 1/1997 Purcell .................. H03M 7/425
348/E5.108
5,748,775 A * 5/1998 Tsuchikawa ....... G06K 9/00369
375/E7.083
(Continued)

FOREIGN PATENT DOCUMENTS

CN    102184546 A    9/2011
JP    2006-024993 A    1/2006
(Continued)

OTHER PUBLICATIONS

International Search Report and Written Opinion of PCT Application No. PCT/JP2015/070342, dated Oct. 13, 2015, 05 pages of English Translation and 05 pages of ISRWO.
(Continued)

*Primary Examiner* — David E Harvey
(74) *Attorney, Agent, or Firm* — Chip Law Group

(57) ABSTRACT

In a signal processing apparatus for an imaging apparatus, a motion vector generator divides a frame of interest of frames of time-series RAW data that constitute video into macroblocks and generates motion vector information between a macroblock of the frame of interest and a macroblock of a reference frame that corresponds to the macroblock of the frame of interest, the reference frame being a frame preceding the frame of interest. A determination unit determines
(Continued)

whether the macroblock of the frame of interest is a target of development, based on the motion vector information. A development unit develops a macroblock that is determined as being the target of development, to generate a frame of interest. A composition unit copies and composites the developed macroblock of the reference frame based on the motion vector information to a position of a macroblock of the frame of interest that is determined as not being the target of development.

6 Claims, 11 Drawing Sheets

(51) Int. Cl.
   *H04N 19/61* (2014.01)
   *G08B 13/196* (2006.01)
   *H04N 7/18* (2006.01)

(56) References Cited

U.S. PATENT DOCUMENTS

| | | | | |
|---|---|---|---|---|
| 6,072,830 | A * | 6/2000 | Proctor | G06T 9/008 375/240.22 |
| 6,081,551 | A * | 6/2000 | Etoh | G06T 9/001 375/240 |
| 7,664,292 | B2 * | 2/2010 | van den Bergen | G06K 9/00771 348/152 |
| 8,736,682 | B2 * | 5/2014 | Sukenori | H04N 5/262 348/169 |
| 9,183,617 | B2 * | 11/2015 | Goh | H04N 19/117 |
| 2003/0103567 | A1 * | 6/2003 | Riemens | H04N 19/433 375/240.16 |
| 2003/0123751 | A1 * | 7/2003 | Krishnamurthy | H04N 19/46 382/282 |
| 2004/0136461 | A1 * | 7/2004 | Kondo | H04N 19/105 375/240.16 |
| 2004/0179620 | A1 * | 9/2004 | Foo | H04N 19/513 375/240.27 |
| 2005/0036699 | A1 * | 2/2005 | Holcomb | H04N 19/176 382/239 |
| 2005/0193311 | A1 * | 9/2005 | Das | H04N 19/537 714/753 |
| 2005/0232500 | A1 * | 10/2005 | Boon | H04N 19/105 382/236 |
| 2007/0071104 | A1 * | 3/2007 | Kondo | H04N 19/159 375/240.21 |
| 2007/0133684 | A1 * | 6/2007 | Ikegami | H04N 5/145 375/240.16 |
| 2007/0140574 | A1 * | 6/2007 | Yamaguchi | H04N 19/176 382/233 |
| 2007/0274402 | A1 * | 11/2007 | Ibrahim | G06T 7/254 375/240.29 |
| 2008/0080779 | A1 * | 4/2008 | Nakanishi | H04N 19/139 382/236 |
| 2008/0095399 | A1 * | 4/2008 | Cui | H04N 5/145 382/103 |
| 2008/0192985 | A1 * | 8/2008 | Shimazu | H04N 5/144 382/107 |
| 2009/0086816 | A1 * | 4/2009 | Leontaris | H04N 19/80 375/240.03 |
| 2009/0110078 | A1 * | 4/2009 | Crinon | H04N 5/21 375/240.24 |
| 2011/0142134 | A1 * | 6/2011 | Wahadaniah | H04N 19/176 375/240.16 |
| 2011/0170600 | A1 | 7/2011 | Ishikawa | |
| 2011/0199515 | A1 * | 8/2011 | Sukenori | H04N 5/262 348/239 |
| 2011/0249742 | A1 * | 10/2011 | Price | H04N 19/46 375/240.16 |
| 2012/0140833 | A1 * | 6/2012 | Takada | H04N 19/20 375/240.26 |
| 2012/0169923 | A1 * | 7/2012 | Millar | H04N 19/23 348/399.1 |
| 2012/0195473 | A1 * | 8/2012 | De Haan | G06T 7/20 382/107 |
| 2013/0028318 | A1 * | 1/2013 | Maruyama | H04N 19/159 375/240.12 |
| 2013/0170557 | A1 * | 7/2013 | Wang | H04N 19/00 375/240.24 |
| 2013/0170746 | A1 * | 7/2013 | Zhang | G06T 5/001 382/165 |
| 2014/0044181 | A1 * | 2/2014 | Siast | H04N 19/52 375/240.16 |
| 2015/0195558 | A1 * | 7/2015 | Kim | H04N 19/56 375/240.16 |

FOREIGN PATENT DOCUMENTS

| | | |
|---|---|---|
| JP | 2006-24993 A | 1/2006 |
| JP | 2011-141824 A | 7/2011 |
| JP | 2012-175631 A | 9/2012 |
| JP | 2013-175803 A | 9/2013 |

OTHER PUBLICATIONS

International Preliminary Report on Patentability of PCT Application No. PCT/JP2015/070342, dated Apr. 6, 2017, 07 pages of English Translation and 03 pages of IPRP.

* cited by examiner

| MB type | Processing method |
|---|---|
| MC_Coded | Motion compensation prediction is performed<br>DCT and coding are performed |
| NonMC_Coded | Prediction is performed using same position of reference frame<br>DCT and coding are performed |
| MC_NotCoded | Motion compensation prediction is performed<br>DCT and coding are not performed |
| NonMC_NotCoded | Prediction is performed using same position of reference frame<br>DCT and coding are not performed<br>(Skipped macroblock) |

FIG.7

SIGNAL PROCESSING APPARATUS, IMAGING APPARATUS, AND SIGNAL PROCESSING METHOD TO REDUCE ELECTRIC POWER REQUIRED FOR SIGNAL PROCESSING

CROSS REFERENCE TO RELATED APPLICATIONS

This application is a U.S. National Phase of International Patent Application No. PCT/JP2015/070342 filed on Jul. 16, 2015, which claims priority benefit of Japanese Patent Application No. JP 2014-194991 filed in the Japan Patent Office on Sep. 25, 2015. Each of the above-referenced applications is hereby incorporated herein by reference in its entirety.

TECHNICAL FIELD

The present technology relates to a signal processing apparatus, an imaging apparatus, and a signal processing method. More particularly, the present technology relates to a signal processing apparatus and an imaging apparatus to be used in a surveillance camera or a wearable apparatus, a processing method therefor, and a program that causes a computer to execute such a method.

BACKGROUND ART

Conventionally, an imaging apparatus that achieves low power consumption has been used in an imaging apparatus such as a surveillance camera. For example, the following system has been proposed. In this system, high-resolution processing is performed on a region of an image signal input from an imaging element, which is designated by a user, or a region thereof in which an image moves. Meanwhile, low-resolution processing is performed on a region excluding such a region (e.g., see Patent Literature 1). It achieves a reduction in electric power required for signal processing by using both of the high-resolution processing and the low-resolution processing that is simple processing.

CITATION LIST

Patent Literature

Patent Literature 1: Japanese Patent Application Laid-open No. 2012-175631

DISCLOSURE OF INVENTION

Technical Problem

In the above-mentioned conventional technology, signal processing that is the high-resolution processing or the low-resolution processing with respect to all image signals output by imaging elements is required. Therefore, there has been a problem in that electric power cannot be sufficiently reduced.

The present technology has been conceived in view of the above-mentioned circumstances and it is an object thereof to reduce electric power required for signal processing.

Solution to Problem

The present technology has been made for overcoming the above-mentioned problem. The first aspect is a signal processing apparatus including: a motion vector generator that divides a frame of interest of frames formed of time-series RAW data that constitute video into macroblocks and generates motion vector information between a macroblock of the frame of interest and a macroblock of a reference frame, which corresponds to the macroblock of the frame of interest, the reference frame being a frame preceding the frame of interest, a determination unit that makes, on the basis of the generated motion vector information, a determination as to whether or not the macroblock of the frame of interest is a target of development that is pre-processing in compressing and coding RAW data, a development unit that develops a macroblock, which is determined as being the target of development, to generate a frame of interest after development, and a composition unit that copies and composites the developed macroblock of the reference frame based on the motion vector information to a position of a macroblock of the frame of interest after development, which is determined as not being the target of development. This provides an operation of making, on the basis of the motion vector information, a determination as to whether or not the image data of the frame of interest is the target of development in units of macroblock. Further, it also provides an operation of copying the image data after development from the macroblock corresponding to the reference frame with respect to the macroblock determined as not being the target of development.

Further, in the first aspect, the motion vector information may include a motion vector indicating a relative position relationship between an image of a macroblock of the frame of interest and an image of a macroblock of the reference frame, and a vector residual indicating a difference between a macroblock of the frame of interest and a macroblock of the reference frame correspondingly to the motion vector, the determination unit may make the determination on the basis of the vector residual, and the composition unit may perform the copying on the basis of the motion vector. This provides an operation in which the determination unit makes the determination on the basis of the vector residual and the composition unit performs the copying on the basis of the motion vector.

Further, in the first aspect, the signal processing apparatus may further include an image compressor that compresses the composited frame of interest on the basis of predetermined target compression information, in which the determination unit may make the determination on the basis of the vector residual and the target compression information. This provides an operation in which the determination unit makes the determination on the basis of the vector residual and the target compression information.

Further, in the first aspect, the image compressor may include a DCT unit that converts the composited frame of interest into a discrete cosine transform coefficient, a quantization table retainer that retains a quantization table for quantizing the discrete cosine transform coefficient, and a quantizer that quantizes the discrete cosine transform coefficient on the basis of the retained quantization table and performs the compression, and the target compression information may be the retained quantization table. This provides an operation in which the determination unit makes the determination on the basis of the vector residual and the quantization table.

Further, a second aspect of the present technology is an imaging apparatus including: an imaging element that outputs RAW data; and a signal processing apparatus that processes the RAW data output from the imaging element, the signal processing apparatus including a motion vector generator that divides a frame of interest of frames formed of time-series RAW data that constitute video into macroblocks and generates motion vector information between a macroblock of the frame of interest and a macroblock of a reference frame, which corresponds to the macroblock of the frame of interest, the reference frame being a frame preceding the frame of interest, a determination unit that makes, on the basis of the generated motion vector information, a determination as to whether or not the macroblock of the frame of interest is a target of development that is pre-processing in compressing and coding RAW data, a development unit that develops a macroblock, which is determined as being the target of development, to generate a frame of interest after development, and a composition unit that copies and composites the developed macroblock of the reference frame based on the motion vector information to a position of a macroblock of the frame of interest after development, which is determined as not being the target of development. This provides an operation of making, on the basis of the motion vector information, a determination as to whether or not the image data of the frame of interest is the target of development in units of macroblock. Further, it also provides an operation of copying the image data after development from the macroblock corresponding to the reference frame with respect to the macroblock determined as not being the target of development.

Further, a third aspect of the present technology is a signal processing method including: a motion vector generation step where a frame of interest of frames formed of time-series RAW data that constitute video is divided into macroblocks and motion vector information between a macroblock of the frame of interest and a macroblock of a reference frame, which corresponds to the macroblock of the frame of interest, the reference frame being a frame preceding the frame of interest, is generated, a determination step where, on the basis of the generated motion vector information, a determination as to whether or not the macroblock of the frame of interest is a target of development that is pre-processing in compressing and coding RAW data is made, a development step where the development is made on a macroblock determined as being the target of development and generates a frame of interest after development, and a composition step where the developed macroblock of the reference frame based on the motion vector information is copied and composited to a position of a macroblock of the frame of interest after development, which is determined as not being the target of development. This provides an operation of making, on the basis of the motion vector information, a determination as to whether or not the image data of the frame of interest is the target of development in units of macroblock. Further, it also provides an operation of copying the image data after development from the macroblock corresponding to the reference frame with respect to the macroblock determined as not being the target of development.

Advantageous Effects of Invention

In accordance with the present technology, it is possible to exert an excellent effect of reducing electric power necessary for signal processing. It should be noted that the effect described here is not necessarily limitative and may be any effect described in the present disclosure.

BRIEF DESCRIPTION OF DRAWINGS

FIG. 7 A diagram showing MB types of macroblocks in the MPEG system.

MODE(S) FOR CARRYING OUT THE INVENTION

Hereinafter, embodiments for carrying out the present technology (hereinafter, referred to as embodiments) will be described. The descriptions will be made in the following order.

1. First Embodiment (example in which determination is made on basis of vector residual and quantization table)

2. Second Embodiment (example in which determination is made on basis of vector residual)

<1. First Embodiment>

[Configuration of Imaging Apparatus]

Figure 1:
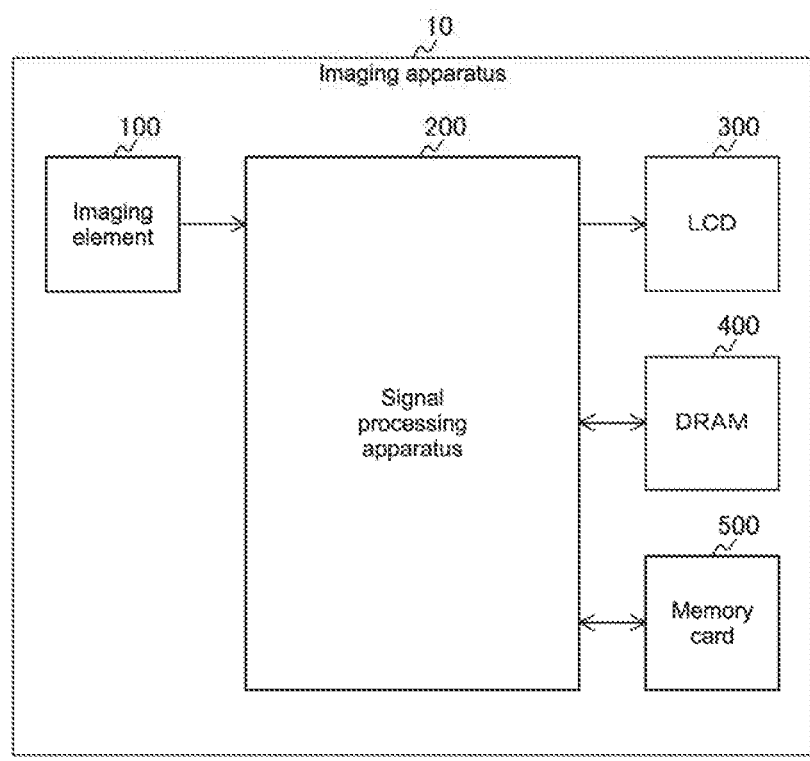
FIG. 1 A diagram showing a configuration example of an imaging apparatus in an embodiment of the present technology.

FIG. 1 is a diagram showing a configuration example of an imaging apparatus in an embodiment of the present technology. The imaging apparatus 10 in the figure includes an imaging element 100, a signal processing apparatus 200, an LCD 300, a DRAM 400, and a memory card 500.

The imaging element 100 generates image signals. The imaging element 100 has a pixel surface in which pixels that output image signals are arranged in a two-dimensional grid form. The imaging element 100 outputs image signals corresponding to light entering the pixel surface. The pixels include, for example, a pixel corresponding to red light, a pixel corresponding to green light, and a pixel corresponding to blue light. Those pixels output an image signal corresponding to red light (R-signal), an image signal corresponding to green light (G-signal), and an image signal corresponding to blue light (B-signal). Note that image data formed of the image signals (R-signal, G-signal, and B-signal) output from the imaging element 100 will be referred to as RAW data. It is image data before demosaicing to be described later.

The signal processing apparatus 200 processes the RAW data output by the imaging element 100. Specifically, the signal processing apparatus 200 develops, compresses, and codes the RAW data to generate a bitstream that is a sequence of bits of image data of video. Here, the development refers to pre-processing in compressing and coding the RAW data. Further, the signal processing apparatus 200 also controls the imaging element 100.

Note that an MPEG (Moving Picture Experts Group) format can be used as a system of coding image data. Further, the signal processing apparatus 200 also generally controls the imaging apparatus 10.

The LCD 300 displays an image. The LCD 300 performs display on the basis of the image data processed by the signal processing apparatus 200. The LCD 300 is used for a so-called live view. Further, the LCD 300 is also used for reproducing and displaying previously-captured image data. The DRAM 400 is a storage apparatus that temporarily stores image signals of RAW data and the like and work data. The memory card 500 saves the bitstream generated by the signal processing apparatus 200 as image data.

[Configuration of Signal Processing Apparatus]

Figure 2:
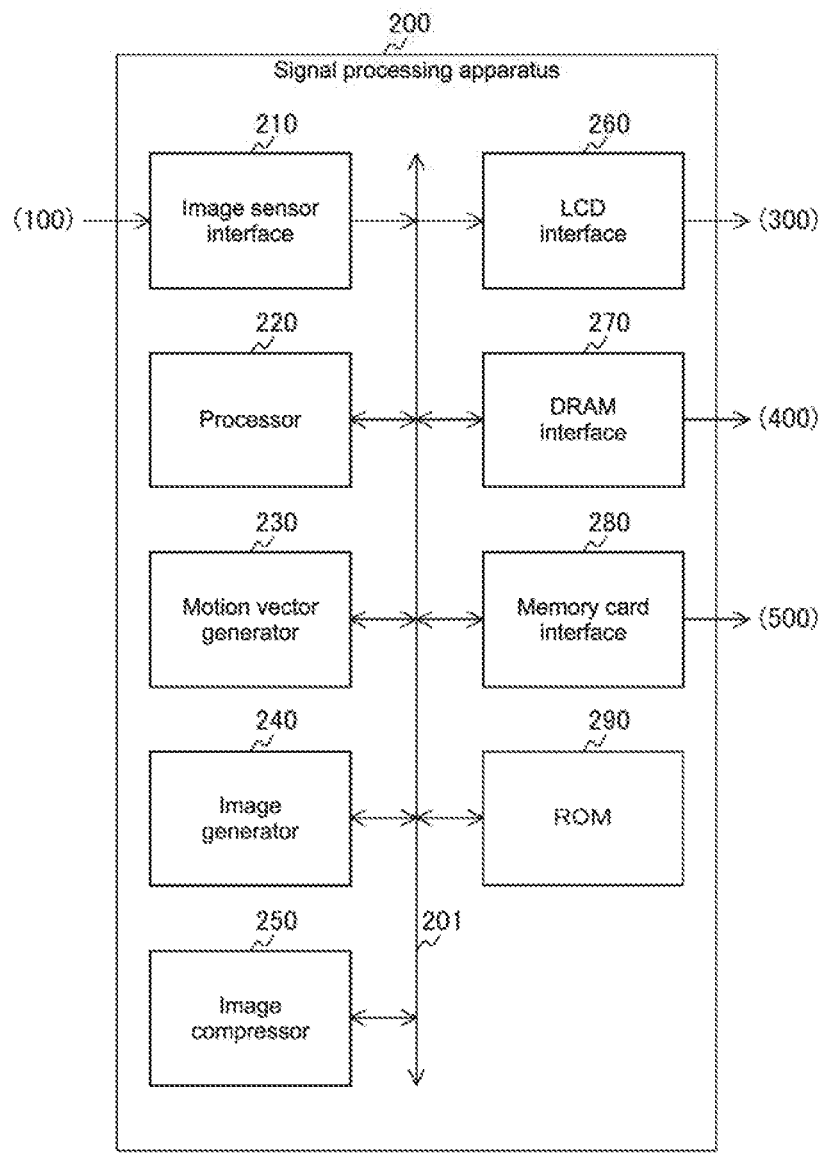
FIG. 2 A diagram showing a configuration example of the signal processing apparatus in the embodiment of the present technology.

FIG. 2 is a diagram showing a configuration example of the signal processing apparatus in the embodiment of the present technology. The signal processing apparatus 200 in the figure includes an image sensor interface 210, a processor 220, a motion vector generator 230, and an image generator 240. Further, the signal processing apparatus 200 in the figure further includes an image compressor 250, an LCD interface 260, a DRAM interface 270, a memory card interface 280, a ROM 290, and a bus apparatus 201.

The image sensor interface 210 interacts with the imaging element 100. The processor 220 generally controls the signal processing apparatus 200. The LCD interface 260 interacts with the LCD 300. The DRAM interface 270 interacts with the DRAM 400. The memory card interface 280 interacts with the memory card 500. The ROM 290 stores firmware of the processor 220.

The motion vector generator 230 generates motion vector information. The image generator 240 generates an image on the basis of the motion vector information generated by the motion vector generator 230. The image compressor 250 compresses the image data generated by the image generator 240. Details thereof will be described later.

The bus apparatus 201 connects the sections that constitute the above-mentioned signal processing apparatus 200 to one another. Note that, in the first embodiment of the present technology, the motion vector generator 230, the image generator 240, and the image compressor 250 are configured by dedicated hardware. However, they may be implemented by software executed by the processor 220.

Signal processing in the embodiment of the present technology will be described. The imaging element 100 is controlled by the signal processing apparatus 200 to perform imaging and output image data for each screen. The signal processing apparatus 200 loads this image data and saves it in an image memory provided in the DRAM 400. Next, the signal processing apparatus 200 sequentially processes a frame that is the image data for one screen. Such a frame is constituted of the above-mentioned RAW data. That is, the signal processing apparatus 200 processes a frame formed of time-series RAW data. Here, a frame that is a target of processing such as development in the signal processing apparatus 200 will be referred to as a frame of interest and a frame preceding the frame of interest in the time-series will be referred to as a reference frame. Further, the signal processing apparatus 200 divides the frame of interest into macroblocks and processes them. For the macroblocks, for example, a 16-by-16 pixel or 8-by-8 pixel size can be used. In the first embodiment of the present technology, for the sake of convenience, it is assumed that the macroblock size is a 16-by-16 pixel size. With this, the above-mentioned motion vector generator 230 generates, in units of macroblock, motion vector information between a macroblock of the frame of interest and a macroblock of the reference frame, which corresponds to the macroblock of the frame of interest.

[Motion Vector Information]

In time-series frames that constitute video, temporally adjacent frames approximate each other. In view of this, when a difference between the frame of interest and the reference frame is calculated in units of macroblock and set to a coding target, it is possible to reduce an amount of data of the video in comparison with the case of coding image data items of all frames. It is called inter-frame prediction coding system, which is widely used as a video compression system such as MPEG. In addition, the following system is also widely used. In this system, a motion vector indicating a relative position relationship between an image of a macroblock of the frame of interest and an image of a macroblock of the reference frame is generated and used, to thereby reduce an amount of data of frames each including a moving object. It is a system in which a difference between the reference frame and the frame of interest is calculated while compensating for a motion of an image therebetween by using the motion vector, which is called motion compensation prediction.

For generating such a motion vector, it is necessary to retrieve images that approximate each other between the frame of interest and the reference frame. A well-known method, for example, block matching can be used therefor. In this method, a macroblock of a frame of interest is compared with a macroblock of a reference frame within a retrieval range, and macroblocks that approximate each other are determined. Specifically, a sum of absolute differences between image data items of pixels contained in the macroblock of the frame of interest and image data items of the corresponding pixels of the macroblock of the reference frame. Then, macroblocks that provide a minimum sum are set as macroblocks that approximate each other.

In the embodiment of the present technology, a motion vector is generated on the basis of the frame of interest and the reference frame formed of the RAW data. At this time, in the embodiment of the present technology, a vector residual is also generated. Here, the vector residual indicates a difference between the macroblock of the frame of interest and the macroblock of the reference frame correspondingly to the motion vector and also indicates a degree of approximation between images contained in such macroblocks. The vector residual can be calculated by determining a sum of absolute differences between RAW data items contained in those macroblocks, for example. The signal processing apparatus 200 in the embodiment of the present technology uses those motion vector and vector residual as the motion vector information for signal processing.

[Configuration of Image Generator]

Figure 3:
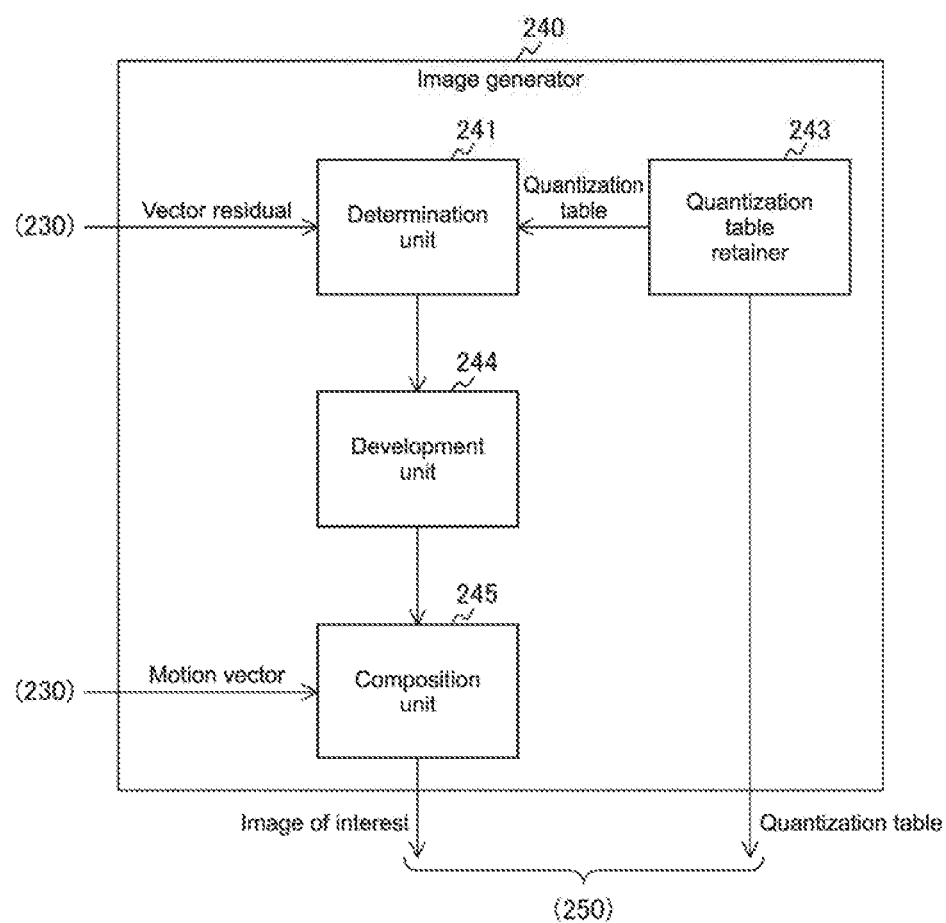
FIG. 3 A diagram showing a configuration example of an image generator in a first embodiment of the present technology.

FIG. 3 is a diagram showing a configuration example of an image generator in the first embodiment of the present technology. The image generator 240 in the figure includes a determination unit 241, a development unit 244, a composition unit 245, and a quantization table retainer 243.

The quantization table retainer 243 retains a quantization table that is target compression information. Here, the target compression information is a compression ratio target in compressing the image data. For this target compression information, for example, stepwise compression ratio targets from a low compression ratio to a high compression ratio can be set. Further, the quantization table is a table used when the image data is quantized in the image compressor 250 and the compression ratio with respect to the image data is set. The quantization table will be described later in detail.

The determination unit 241 makes a determination as to whether or not the macroblock of the frame of interest is a target of development on the basis of the vector residual. As described above, development is pre-processing in compressing and coding the RAW data. Specifically, it corresponds to various types of signal processing performed before image compression with respect to the RAW data. Examples of the various types of signal processing include demosaicing, noise reduction, white balance control, gamma correction, sensor spectral correction, and YC conversion. Note that demosaicing is processing of compensating for two-color image signals insufficient in comparison with other monochromatic image signals (R-signals, G-signals, or B-signals) output by pixels of the imaging elements 100. The noise reduction is processing of removing noise. The white balance control is processing of making adjustment such that the R-signals, the G-signals, and the B-signals with respect to a white object have the same signal level. The gamma correction corrects the R-signals, the G-signals, and the B-signals along a gamma curve. The sensor spectral correction is processing of correcting each image signal in a manner that depends on spectral characteristics of the imaging element 100. The YC conversion is processing of converting the R-signals, the G-signals, and the B-signals into luminance signals and color-difference signals.

Note that, in the first embodiment of the present technology, the determination unit 241 makes a determination on the basis of the vector residual contained in the motion vector information and the quantization table that is the target compression information.

The development unit 244 performs the above-mentioned development on the macroblock of the frame of interest determined as being the target of development by the determination unit 241.

The composition unit 245 copies and composites a developed macroblock of the reference frame based on the motion vector information to a position of a macroblock of the developed frame of interest, which is determined as not being a development target. The frame of interest developed by the development unit 244 lacks image data of a macroblock portion, which is determined as not being the target of development by the determination unit 241. In view of this, the composition unit 245 copies and composites developed image data of the reference frame to this macroblock position. At this time, the macroblock of the reference frame including image data to be copied is selected on the basis of the motion vector. With this, image data items of all the macroblocks of the frame of interest can be transformed into the image data after development. Note that, in the first embodiment of the present technology, the composition unit 245 selects, on the basis of the motion vector contained in the motion vector information, the macroblock of the reference frame including such image data to be copied.

[Image Generation Processing Method]

Figure 4:
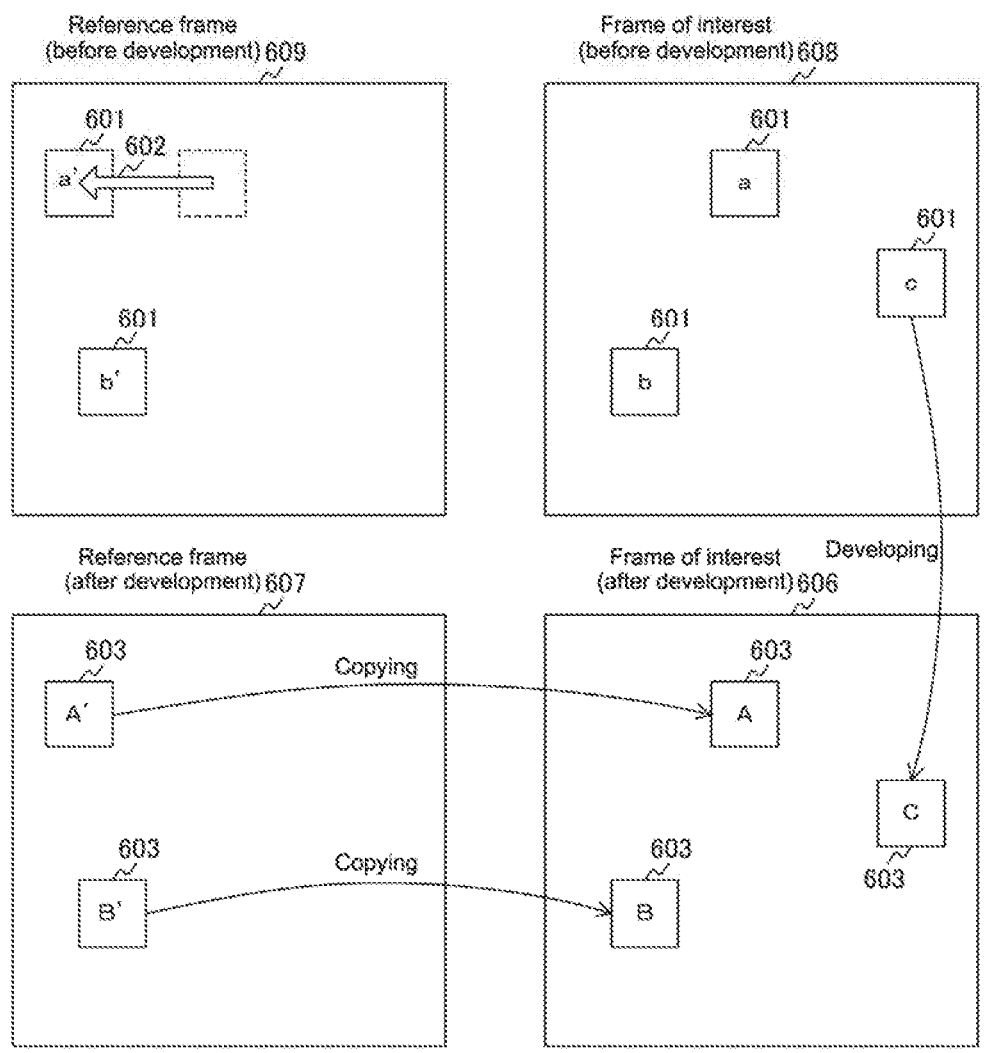
FIG. 4 A diagram showing an image processing method in the first embodiment of the present technology.

FIG. 4 is a diagram showing an image processing method in the first embodiment of the present technology. The figure shows a relationship among a reference frame (before development) 609, a reference frame (after development) 607, a frame of interest (before development) 608, and a frame of interest (after development) 606. Further, regions indicated by squares enclosed in those frames represent macroblocks. Macroblocks 601 represent macroblocks before development. Macroblocks 603 represent macroblocks after development. A symbol added to each of the macroblocks indicates the type of image data of that macroblock. That is, the macroblocks 601 include a, b, c, a', and b' that are RAW data items and the macroblocks 603 include A, B, C, A', and B' that are data items after development thereof. The symbols, a and a' or b and b' are image data items based on an identical object. Therefore, those image data items approximate each other.

Out of them, the object associated with a and a' is moving to the right in the figure and a macroblock 601 with a' in the reference frame (before development) 609 is at a position different from that of a macroblock 601 with a in the frame of interest (before development) 608. A motion vector 602 is a motion vector for compensating for a motion of an image due to the motion of this object. The motion vector 602 is generated in a direction from the position of the macroblock corresponding to the macroblock 601 with a of the frame of interest (before development) 608 to the macroblock 601 with a' of the reference frame (before development) 609. When calculating a difference between image data items, a difference between a macroblock 603 of the frame of interest (after development) 606 and a macroblock 603 of the reference frame (after development) 607 that is a destination of the motion vector 602 is calculated. With this, the motion of the image is compensated for.

Macroblocks 601 with b and b' also represent the macroblocks including the image data items of the identical object. However, it is image data of an object that does not move, the macroblock 601 with b' of the reference frame (before development) 609 is at a position identical to that of the macroblock 601 with b of the frame of interest (before development) 608. In this case, the macroblocks 601 with b and b' are handled as having a generated motion vector of zero magnitude. Note that image data c of the frame of interest (before development) 608 is image data whose approximate image data is absent in the reference frame (before development) 609.

Processing for those frame of interest and reference frame is performed in the following manner. The determination unit 241 determines the macroblock 601 with c as being a target of development. It is because there is no image data that approximates it in the reference frame (before development) 609. Then, the development unit 244 develops the image data c to generate image data C and disposes it at a position corresponding to the macroblock 603 of the frame of interest (after development) 606.

On the other hand, with respect to the macroblock 601 with a and the macroblock 601 with b whose approximate image data items are present in the reference frame (before development) 609, the determination unit 241 determines each of them as not being the target of development. With this, the composition unit 245 copies and composites A' and B' that are image data items of the corresponding reference frame (after development) 607 to positions of the corresponding macroblocks 603 of the frame of interest (after development) 606. At this time, the composition unit 245 selects, on the basis of the motion vector 602, the macroblock 603 of the reference frame (after development) 607 as a copy-source macroblock. With such processing, the image generator 240 generates the frame of interest formed of the developed image data. The generated frame of interest is transferred to the image compressor 250 and compressed and coded. Further, the generated frame of interest is also transferred to the LCD interface 260 and used for display in the LCD 300.

[Determination of Determination Unit]

Figure 5:
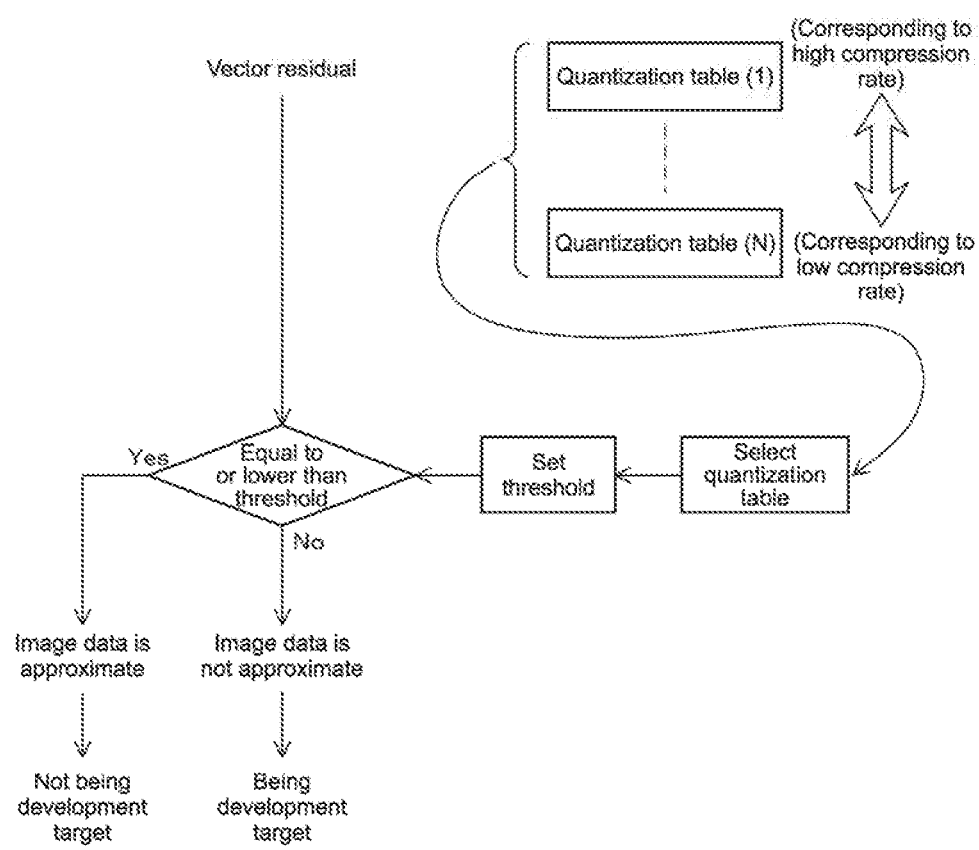
FIG. 5 A diagram showing a determination method in the first embodiment of the present technology.

FIG. 5 is a diagram showing a determination method in the first embodiment of the present technology. Determination of the determination unit 241 is made in the following manner. A check as to whether or not a vector residual of the motion vector information with respect to the macroblocks of the frame of interest (before development) 608 is equal to or lower than a predetermined threshold is made. As a result, when it is equal to or lower than the predetermined threshold, the determination unit 241 determines that image data of a macroblock of the frame of interest (before development) 608 and image data of the corresponding macroblock of the reference frame (before development) 609 approximate each other. Then, such image data of the macroblock of the frame of interest (before development) 608 is determined as not being the target of development.

The threshold is changed by the use of the quantization table. The quantization table retainer 243 retains a plurality of quantization tables. One of them is selected and used for compression in the image compressor 250. When the selected quantization table corresponds to a high compression ratio, the threshold is set to a high value. As a result, even when the degree of approximation between the corresponding image data items of the frame of interest (before development) 608 and the reference frame (before development) 609 is low, it is determined as not being the target of development and the image data is copied from the reference frame (after development) 607. Typically, as a compression ratio of an image becomes higher, a degree of loss of information on details of the image becomes higher. Therefore, even when the image data having a low degree of approximation is copied such that the image quality of the frame of interest (after development) 606 is relatively deteriorated, an influence on the image data after compression is little.

On the other hand, when the quantization table corresponds to a low compression ratio, information on details of the image is still retained after image compression. Therefore, the determination unit 241 sets a low threshold and makes the above-mentioned determination. With this, the degree of approximation between the corresponding image data items of the frame of interest (before development) 608 and the reference frame (before development) 609 is increased and copying is performed. Thus, quality deterioration, which would occur due to the processing of the image generator 240, can be prevented. In this manner, in the first embodiment of the present technology, the determination is made on the basis of the vector residual and the quantization table. Note that a relationship between the quantization table and the compression ratio will be described later.

[Method of Copying Frame]

Figure 6:
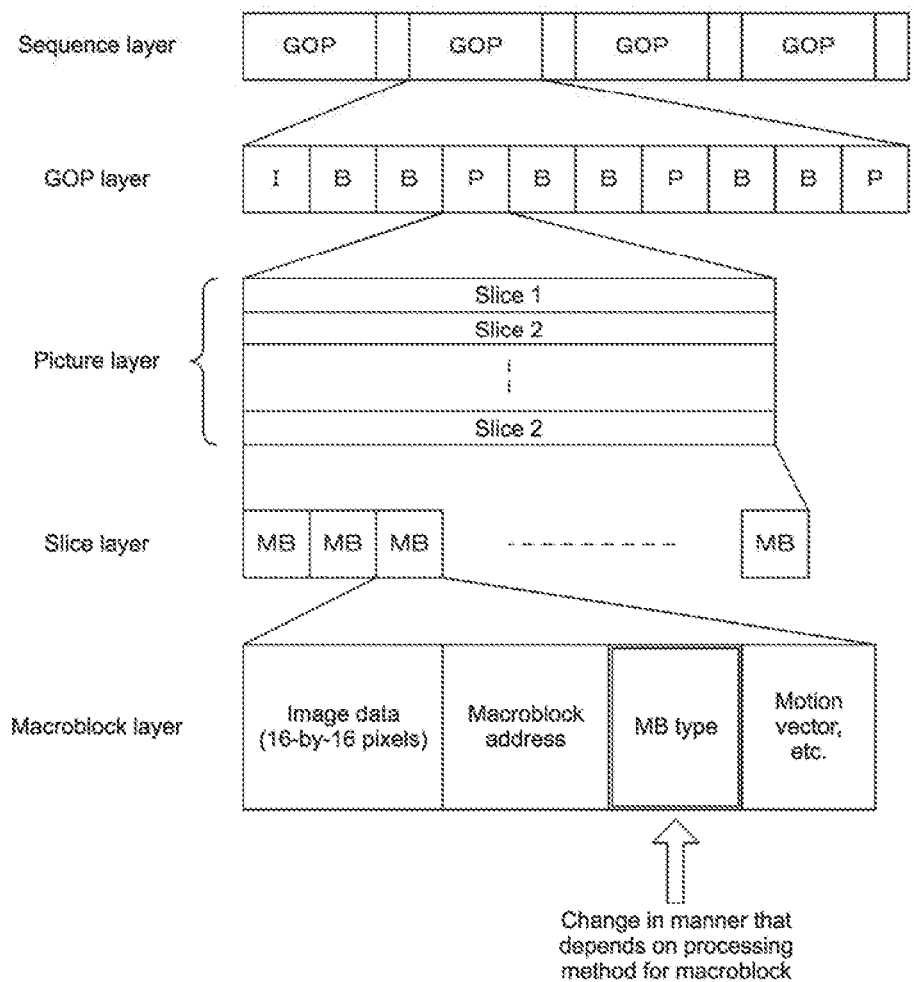
FIG. 6 A diagram showing a structure of a bitstream in an MPEG system.

FIG. 6 is a diagram showing a structure of a bitstream in the MPEG system. When the MPEG system is used as a video compression method of the image compressor 250, the above-mentioned copying of image data can be omitted. This method will be described. A bitstream in the MPEG system has a layered structure as shown in the figure. That is, it is constituted of a sequence layer, a GOP (Group of Pictures) layer, a picture layer, a slice layer, and a macroblock layer in sequential order from the top. Note that symbols I, B, and P in the figure indicate the types of picture layers. Further, each symbol MB indicates a macroblock layer. Compressed image data is disposed in the macroblock layer in units of macroblock. The MB type of each macroblock is also disposed in this macroblock layer. The MB type is a symbol indicating a processing method for such a macroblock. The use of the MB type enables composition of the frame of interest to be performed without copying the image data. Note that, in addition to this, the macroblock layer also includes information on a macroblock address, a motion vector, and the like indicating an increment from a directly preceding macroblock.

Note that compression and coding of the image are not performed in displaying the LCD 300. Therefore, with respect to the frame of interest transferred to the LCD interface 260, it is necessary to copy and composite image data of the developed macroblock of the reference frame to the macroblock of the frame of interest.

[MB Type]

FIG. 7 is a diagram showing MB types of macroblocks in the MPEG system. Note that the DCT shown in the figure forms a part of compression processing in the MPEG system and will be described later in details. The MB type in the figure is classified on the basis of motion compensation prediction and discrete cosine transform (DCT) and coding.

Regarding the macroblock whose MB type is set to "MC Coded", motion compensation prediction is performed. That is, a difference between the macroblock of the frame of interest and the macroblock of the reference frame is calculated correspondingly to the motion vector. Next, DCT and coding are performed on the calculated difference.

Regarding the macroblock whose MB type is set to "NonMC Coded", a difference between the macroblock of the frame of interest and the macroblock of the reference frame at the same position is calculated instead of motion compensation prediction. Next, DCT and coding are performed on the calculated difference.

Regarding the macroblock whose MB type is set to "MC NotCoded", motion compensation prediction is performed. However, DCT and coding are not performed. Instead, image data of the macroblock of the reference frame after coding is used.

Regarding the macroblock whose MB type is set to "NonMC NotCoded", any of motion compensation prediction, DCT, and coding is not performed. Instead, coded image data of the macroblock of the reference frame at the same position as the macroblock of the frame of interest is used. This processing mode corresponds to a skipped macroblock employed in MPEG4. On this processing mode, it is considered that the magnitude of the motion vector is zero.

Note that, regarding the macroblock whose MB type is set to "MC NotCoded" or "NonMC NotCoded", image data of the corresponding macroblock of the reference frame is copied and used in an apparatus that decodes the bitstream.

In the first embodiment of the present technology, the MB type of this "MC NotCoded" or "NonMC NotCoded" is used. Specifically, instead of copying image data of the developed macroblock of the reference frame, "MC NotCoded" or "NonMC NotCoded" is set as the MB type of the macroblock of such a frame of interest. Regarding a macroblock 603 with the symbol A of the frame of interest (after development) 606 described in FIG. 4, "MC NotCoded" is set as the MB type. On the other hand, regarding a macroblock 603 with the symbol B of the frame of interest (after development) 606, "NonMC NotCoded" is set as the MB type. It is because the macroblock 603 with the symbol B is different from the macroblock 603 with the symbol A and it is handled as having a generated motion vector of zero magnitude. With this, it is possible to dispose image data items after development with respect to all the macroblocks of the frame of interest without copying the image data. Thus, the composited frame of interest can be obtained.

Note that the processing for macroblocks based on the MB type described with reference to FIG. 7 is not limited to the signal processing apparatus employing the MPEG system and it can be applied to a signal processing apparatus that performs motion compensation prediction and image compression.

[Configuration of Image Compressor]

Figure 8:
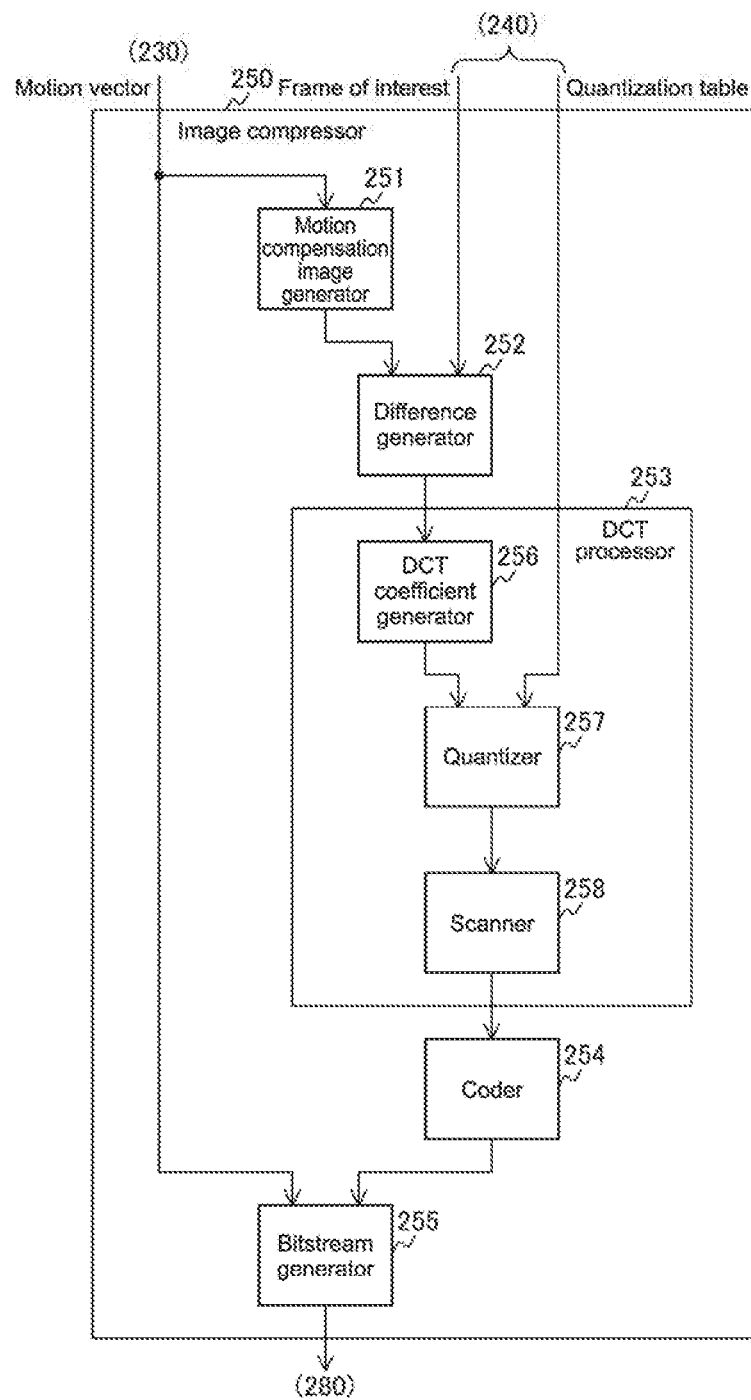
FIG. 8 A diagram showing a configuration example of an image compressor in the first embodiment of the present technology.

FIG. 8 is a diagram showing a configuration example of an image compressor in the first embodiment of the present technology. The image compressor 250 in the figure includes a motion-compensated image generator 251, a difference generator 252, a DCT processor 253, a coder 254, and a bitstream generator 255.

The motion-compensated image generator 251 generates a motion-compensated frame by subjecting the reference frame to motion compensation based on the motion vector.

The difference generator 252 calculates a difference of the image data between the motion-compensated frame and the frame of interest. The difference generator 252 generates a difference of the image data of the macroblocks at the same position between the motion-compensated frame and the frame of interest. Note that the motion-compensated frame and the frame of interest are constituted of a luminance signal and a color-difference signal that are the image data after development. Regarding a configuration of the macroblock including them, for example, the luminance signal can be set to a 16-by-16 pixel size and the color-difference signal can be set to an 8-by-8 pixel size having a smaller amount of data than that of the luminance signal. With respect to each of those luminance signal and color-difference signal, a difference is generated. Further, information on the MB type and the like is added to the macroblock.

The DCT processor 253 performs discrete cosine transform (DCT) on the difference of the image data, which is generated by the difference generator 252, and compresses the thus generated DCT coefficient. At this time, the DCT processor 253 performs compression on the basis of the quantization table that is the target compression information. In addition, the DCT processor 253 generates and outputs a DCT coefficient sequence formed of the compressed DCT coefficients.

The DCT processor 253 includes a DCT coefficient generator 256, a quantizer 257, and a scanner 258. The DCT coefficient generator 256 performs DCT on the difference of the image data, which is generated by the difference generator 252, to generate a DCT coefficient. The quantizer 257 quantizes this DCT coefficient on the basis of the quantization table. The scanner 258 converts the quantized DCT coefficient into a one-dimensional coefficient sequence. Such processing will be described later in detail. Note that the DCT coefficient generator 256 is an example of the DCT unit described in the scope of claims.

The coder 254 codes the one-dimensional DCT coefficient sequence. The use of an entropy coding method as this coding method makes it possible to eliminate redundant symbols and further compress the image data.

The bitstream generator 255 generates a bitstream on the basis of the coded image data. The bitstream generator 255 adds information on the motion vector, the MB type, and the quantization table to the coded image data. After that, a sequence of bits having the above-mentioned layered structure is generated. The generated bitstream is saved in the memory card 500 via the memory card interface 280.

Note that macroblocks provided with "MC NotCoded" and "NonMC NotCoded" as the MB type are excluded from targets of processing of the difference generator 252, the DCT processor 253, and the coder 254. Then, they are output as macroblocks without the coded DCT coefficient.

[Processing in DCT Processor]

Figure 9:
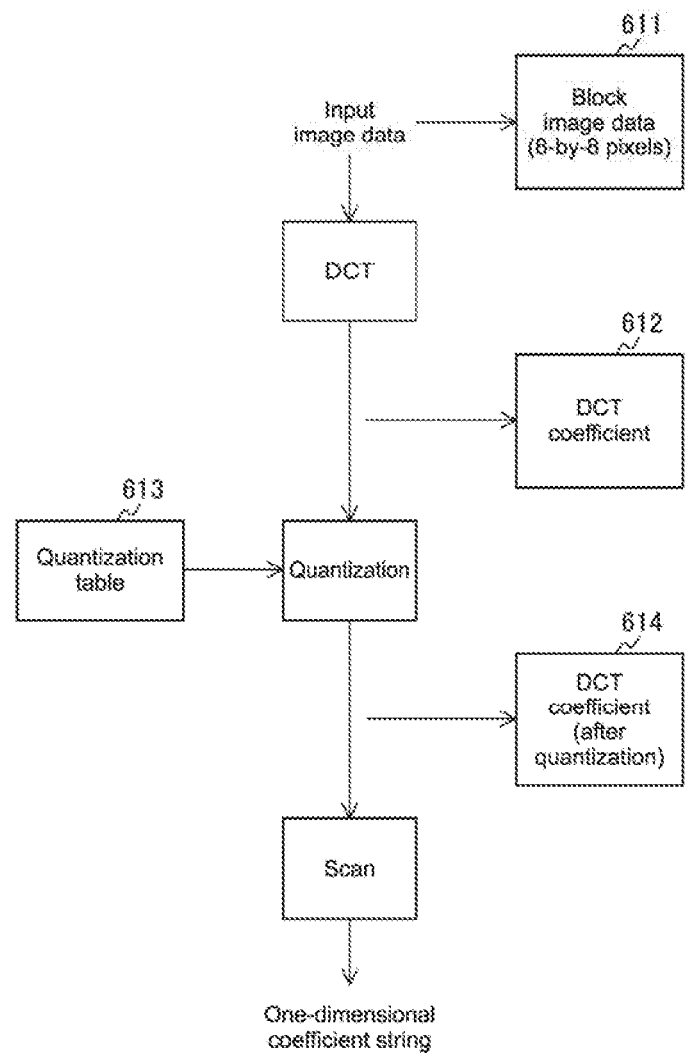
FIG. 9 A diagram showing DCT processing in the first embodiment of the present technology.

FIG. 9 is a diagram showing DCT processing in the first embodiment of the present technology. The DCT processor 253 performs processing on each block image data 611 having a format of an 8-by-8 pixel size. Here, it is assumed that, regarding a configuration of the image of the macroblock of the frame of interest data generated by the image generator 240, the luminance signal is set to a 16-by-16 pixel size and the color-difference signal is set to an 8-by-8 pixel size. In this case, a difference of the image data, which is generated by the difference generator 252, is also image data having a similar format. The DCT processor 253 processes the luminance signal after dividing the image data having a 16-by-16 pixel size by four to convert it into the block image data 611 having an 8-by-8 pixel size. On the other hand, the color-difference signal has an 8-by-8 pixel size, and hence the DCT processor 253 processes it as the block image data 611 without dividing it.

First of all, the DCT coefficient generator 256 performs DCT on the input block image data 611. This DCT divides the image data into two-dimensional frequency components and generates a DCT coefficient 612 that is a coefficient of each frequency component. The DCT coefficient 612 is data having an 8-by-8 table format like the block image data 611.

Next, the quantizer 257 quantizes the DCT coefficient 612 on the basis of a quantization table 613 to generate a DCT coefficient (after quantization) 614. The quantization table 613 is also data having the 8-by-8 table format. The quantization is performed by dividing a table value of the DCT coefficient 612 by the corresponding table value of the quantization table 613. At this time, a result of division is rounded up or down to an integer.

In this manner, the DCT coefficient (after quantization) 614 is expressed by a multiple of the value of the quantization table 613, and hence the amount of data is reduced and compressed. As a larger value is used as the value of the quantization table 613, the DCT coefficient after quantization becomes a smaller value. That is, an aimed compression ratio of the image data, which is a target, can be changed in a manner that depends on the value of the quantization table 613. The quantization table 613 having a larger value becomes a quantization table corresponding to the higher compression ratio described above with reference to FIG. 5. The quantization table 613 having a smaller value becomes a quantization table corresponding to the lower compression ratio described above with reference to FIG. 5. Finally, the scanner 258 scans the DCT coefficient (after quantization) 614 and converts it into the one-dimensional coefficient sequence. For example, zigzag scan can be used as this scan method.

[Processing Procedure of Image Generation Processing]

Figure 10:
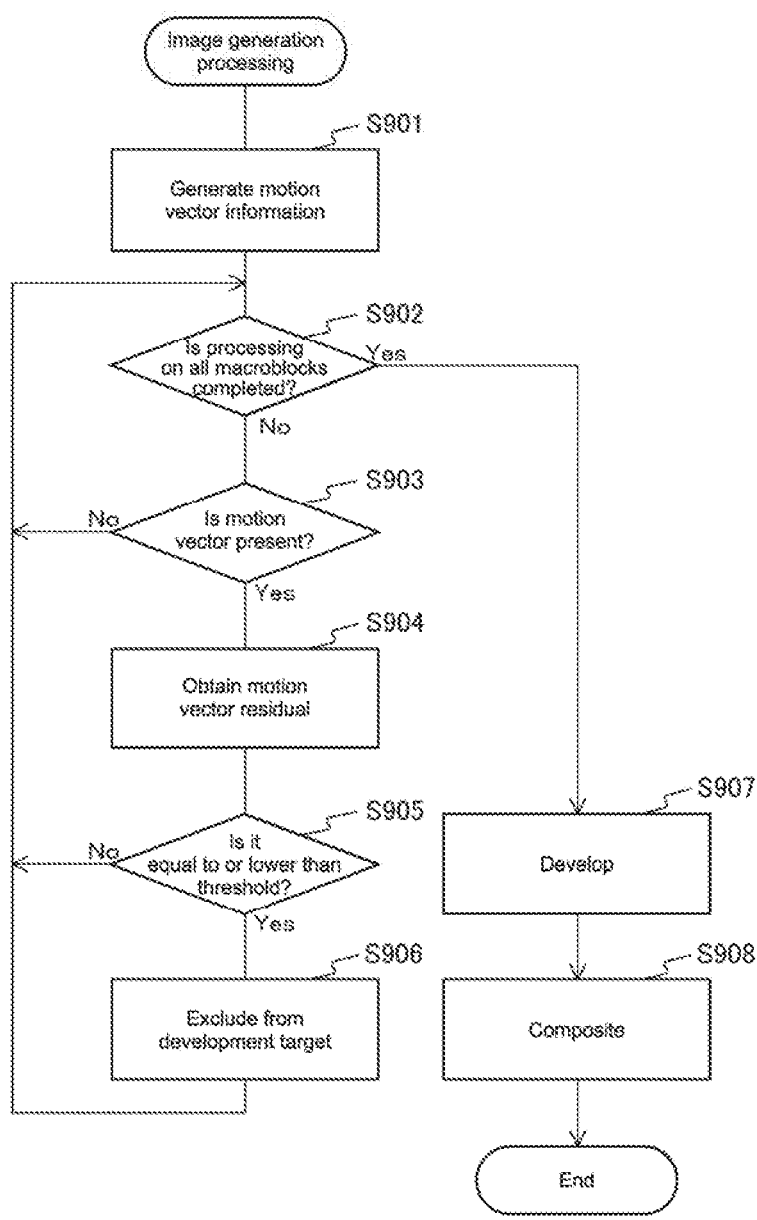
FIG. 10 A diagram showing an example of a processing procedure of image generation processing in the first embodiment of the present technology.

FIG. 10 is a diagram showing an example of a processing procedure of image generation processing in the first embodiment of the present technology. When image data for one frame is input from the imaging element 100, the signal processing apparatus 200 starts the image generation processing. First of all, the signal processing apparatus 200 divides a frame formed of the input image data, as a frame of interest, into macroblocks and generates motion vector information (Step S901). Next, the signal processing apparatus 200 makes a determination whether or not processing is terminated on all the macroblocks (Step S902). As a result, when the processing is not completed (Step S902: No), the processing of Step S903 to Step S906 is repeated until the processing on all the macroblocks is completed.

In Step S903, the signal processing apparatus 200 selects a macroblock on which processing is not completed and makes a determination as to whether or not a motion vector is generated with respect to such a macroblock (Step S903). As a result, when the motion vector is not generated (Step S903: No), the signal processing apparatus 200 returns to the processing of Step S902. On the other hand, when the motion vector is generated (Step S903: Yes), the signal processing apparatus 200 obtains a motion vector residual (Step S904). When the motion vector residual is equal to or smaller than a threshold (Step S905: Yes), the signal processing apparatus 200 excludes this macroblock from the target of development (Step S906) and returns to the processing of Step S902. When the motion vector residual is larger than the threshold (Step S905: No), the signal processing apparatus 200 skips the processing of Step S906 and returns to the processing of Step S902.

When, in the processing of Step S902, the processing is completed with respect to all the macroblocks (Step S902: Yes), the signal processing apparatus 200 performs development (Step S907). At this time, the signal processing apparatus 200 develops a macroblock other than the macroblock excluded from the target of development in Step S906. Next, the signal processing apparatus 200 copies and composites the image data after development of the reference frame to a position of the macroblock of the frame of interest excluded from the target of development in Step S906 (Step S908). After that, the signal processing apparatus 200 terminates the image generation processing.

In this manner, in accordance with the first embodiment of the present technology, the signal processing apparatus 200 makes, on the basis of the vector residual and the quantization table, a determination as to whether or not to develop the RAW data of the macroblock of the frame of interest. Then, the signal processing apparatus 200 copies the developed macroblock of the reference frame to a position of the macroblock on which it is determined that development is not to be performed. Thus, development processing in such a macroblock can be omitted and electric power required for development processing can be reduced.

<2. Second Embodiment>

In the first embodiment, the signal processing apparatus 200 makes a determination as to whether or not to develop the RAW data of the macroblock of the frame of interest, on the basis of the vector residual and the quantization table. Meanwhile, in a second embodiment of the present technology, the signal processing apparatus 200 makes a determination on the basis of only the vector residual. With this, processing of the determination unit will be simplified.

[Configuration of Image Generator]

Figure 11:
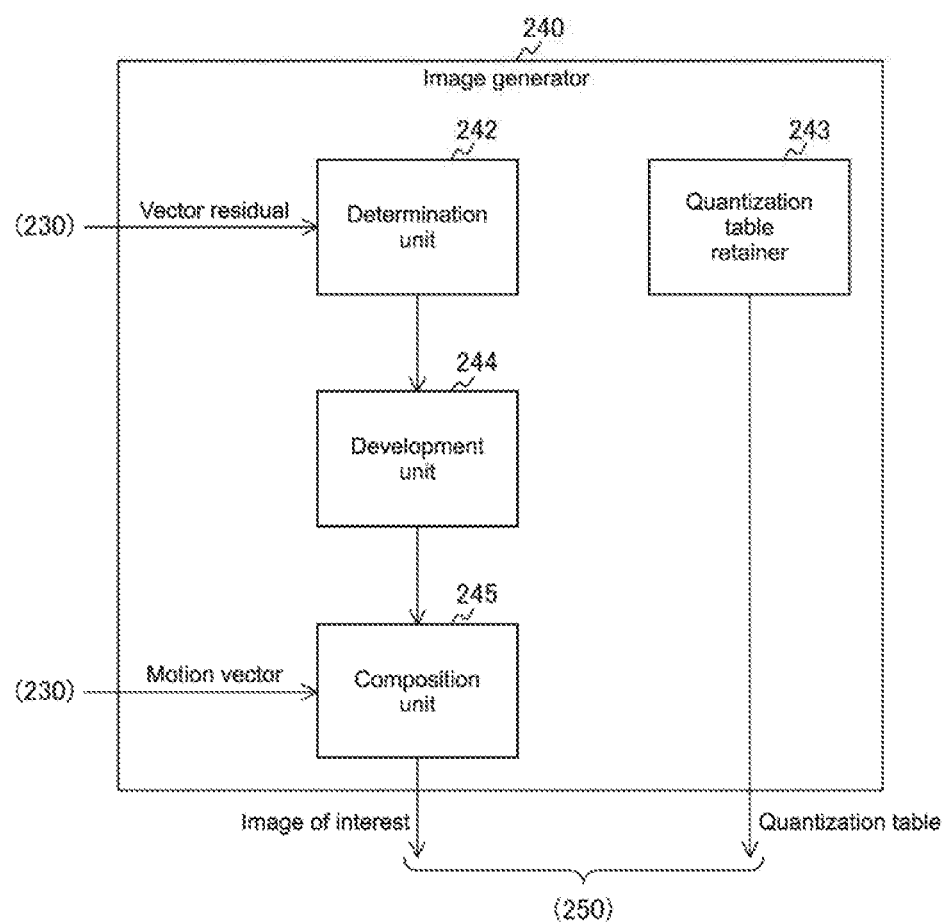
FIG. 11 A diagram showing a configuration example of an image generator in a second embodiment of the present technology.

FIG. 11 is a diagram showing a configuration example of an image generator in the second embodiment of the present technology. The image generator 240 in the figure includes a determination unit 242 instead of the determination unit 241 in comparison with the image generator 240 described above with reference to FIG. 3. The determination unit 242 makes a determination on the basis of only the vector residual. As described above in the first embodiment, a determination as to whether or not to develop the RAW data is made by comparing the vector residual with the above-mentioned threshold. In the second embodiment of the present technology, the threshold is set to a certain value without referring to a value of the quantization table that is the target compression information. With this, the determination unit 242 is capable of making a determination on the basis of only the vector residual. Configurations of the image generator 240, the signal processing apparatus 200, and the like other than this are similar to those of the first embodiment and descriptions thereof will be omitted.

In this manner, in accordance with the second embodiment of the present technology, the signal processing apparatus 200 makes, on the basis of only the vector residual, a determination as to whether or not to develop the RAW data of the macroblock of the frame of interest is made, and hence processing of the determination unit 242 can be simplified.

As described above, in accordance with the embodiment of the present technology, the signal processing apparatus 200 performs a determination as to whether or not to develop the image data of the frame of interest in units of macroblock and copies the image data after development of the reference frame to the macroblock on which it is determined that development is not to be performed. With this, the signal processing on development of such image data can be deleted and electric power required for this can be reduced.

Note that the above-mentioned embodiments provide examples for embodying the present technology and the matters in the embodiments and the invention-specifying matters in the scope of claims are associated. Similarly, the invention-specifying matters in the scope of claims and the matters in the embodiments of the present technology, which are denoted by the identical names, have correspondence. It should be noted that the present technology is not limited to the embodiments and can be embodied by making various modifications to the embodiments without departing from its essence.

Further, the processing procedures described in the above embodiments may be construed as methods including those series of procedures or a program for causing a computer to execute those series of procedures or may be construed as a recording medium storing that program. As this recording medium, a CD (Compact Disc), an MD (Mini Disc), a DVD (Digital Versatile Disc), a memory card, and a Blu-ray (registered trademark) disc can be used, for example.

Note that the effects described herein are merely examples and not limitative and other effects may be provided.

It should be noted that the present technology may also take the following configurations.

(1) A signal processing apparatus, including:

a motion vector generator that divides a frame of interest of frames formed of time-series RAW data that constitute video into macroblocks and generates motion vector information between a macroblock of the frame of interest and a macroblock of a reference frame, which corresponds to the macroblock of the frame of interest, the reference frame being a frame preceding the frame of interest;

a determination unit that makes, on the basis of the generated motion vector information, a determination as to whether or not the macroblock of the frame of interest is a target of development that is pre-processing in compressing and coding RAW data;

a development unit that develops a macroblock, which is determined as being the target of development, to generate a frame of interest after development; and a composition unit that copies and composites the developed macroblock of the reference frame based on the motion vector information to a position of a macroblock of the frame of interest after development, which is determined as not being the target of development.

(2) The signal processing apparatus according to (1), in which the motion vector information includes a motion vector indicating a relative position relationship between an image of a macroblock of the frame of interest and an image of a macroblock of the reference frame, and a vector residual indicating a difference between a macroblock of the frame of interest and a macroblock of the reference frame correspondingly to the motion vector, the determination unit makes the determination on the basis of the vector residual, and the composition unit performs the copying on the basis of the motion vector.

(3) The signal processing apparatus according to (2), further including an image compressor that compresses the composited frame of interest on the basis of predetermined target compression information, in which the determination unit makes the determination on the basis of the vector residual and the target compression information.

(4) The signal processing apparatus according to (3), in which the image compressor includes
 a DCT unit that converts the composited frame of interest into a discrete cosine transform coefficient,
 a quantization table retainer that retains a quantization table for quantizing the discrete cosine transform coefficient, and
 a quantizer that quantizes the discrete cosine transform coefficient on the basis of the retained quantization table and performs the compression, and
the target compression information is the retained quantization table.

(5) An imaging apparatus, including:
 an imaging element that outputs RAW data; and
 a signal processing apparatus that processes the RAW data output from the imaging element, the signal processing apparatus including
  a motion vector generator that divides a frame of interest of frames formed of time-series RAW data that constitute video into macroblocks and generates motion vector information between a macroblock of the frame of interest and a macroblock of a reference frame, which corresponds to the macroblock of the frame of interest, the reference frame being a frame preceding the frame of interest,
  a determination unit that makes, on the basis of the generated motion vector information, a determination as to whether or not the macroblock of the frame of interest is a target of development that is pre-processing in compressing and coding RAW data,
  a development unit that develops a macroblock, which is determined as being the target of development, to generate a frame of interest after development, and
  a composition unit that copies and composites the developed macroblock of the reference frame based on the motion vector information to a position of a macroblock of the frame of interest after development, which is determined as not being the target of development.

(6) A signal processing method, including:
 a motion vector generation step where a frame of interest of frames formed of time-series RAW data that constitute video is divided into macroblocks and motion vector information between a macroblock of the frame of interest and a macroblock of a reference frame, which corresponds to the macroblock of the frame of interest, the reference frame being a frame preceding the frame of interest, is generated;
 a determination step where, on the basis of the generated motion vector information, a determination as to whether or not the macroblock of the frame of interest is a target of development that is pre-processing in compressing and coding RAW data is made;
 a development step where the development is made on a macroblock determined as being the target of development and generates a frame of interest after development; and
 a composition step where the developed macroblock of the reference frame based on the motion vector information is copied and composited to a position of a macroblock of the frame of interest after development, which is determined as not being the target of development.

REFERENCE SIGNS LIST 10 imaging apparatus
100 imaging element
200 signal processing apparatus
210 image sensor interface
220 processor
230 motion vector generator
240 image generator
241, 242 determination unit
243 quantization table retainer
244 development unit
245 composition unit
250 image compressor
251 motion-compensated image generator
252 difference generator
253 DCT processor
254 coder
255 bitstream generator
256 DCT coefficient generator
257 quantizer
258 scanner
260 LCD interface
270 DRAM interface
280 memory card interface
290 ROM
300 LCD
400 DRAM
500 memory card
601, 603 macroblock
602 motion vector
609 reference frame (before development)
608 frame of interest (before development)
607 reference frame (after development)
606 frame of interest (after development)
611 block image data
612 DCT coefficient
613 quantization table
614 DCT coefficient (after quantization)

The invention claimed is:

1. A signal processing apparatus, comprising:
 circuitry configured to:
  divide a first frame of interest of a video into a plurality of macroblocks, wherein the video comprises a plurality of frames of time series RAW data;
  generate motion vector information between a macroblock of the first frame of interest and a macroblock of a first reference frame that corresponds to the macroblock of the first frame of interest, wherein
   the first reference frame is a frame preceding the first frame of interest, and
   the motion vector information comprises:
    a motion vector that indicates a relative position relationship between an image of the macroblock of the first frame of interest and an image of the macroblock of the first reference frame; and a vector residual that indicates a difference between the macroblock of the first frame of interest and the macroblock of the first reference frame corresponding to motion vector;

determine whether the macroblock of the first frame of interest is a target of development, based on the vector residual, wherein the development comprises signal processing on the RAW data;

generate a second frame of interest based on the development of the macroblock of the first frame of interest that is determined as the target of development; and generate a third frame of interest based on copy and composite of a macroblock of a second reference frame to a position of the macroblock of the first frame of interest that is determined as not being the target of development, wherein the macroblock of the second reference frame is copied and composited based on the motion vector.

2. The signal processing apparatus according to claim 1, wherein the circuitry is further configured to compress the third frame of interest based on target compression information, and the determination whether the macroblock of the first frame of interest is the target of development is based on the vector residual and the target compression information.

3. The signal processing apparatus according to claim 2, wherein the circuitry is further configured to:

convert the third frame of interest into a discrete cosine transform coefficient;

retain a quantization table to quantize the discrete cosine transform coefficient; and quantize the discrete cosine transform coefficient based on the retained quantization table, wherein the compression of the third frame of interest is based on the quantization, and the target compression information is the retained quantization table.

4. An imaging apparatus, comprising:

an imaging element configured to output RAW data; and a signal processing apparatus configured to process the RAW data, wherein the signal processing apparatus comprises circuitry configured to:

divide a first frame of interest of a video into a plurality of macroblocks, wherein the video comprises a plurality of frames of time series RAW data;

generate motion vector information between a macroblock of the first frame of interest and a macroblock of a first reference frame that corresponds to the macroblock of the first frame of interest, wherein the first reference frame is a frame preceding the first frame of interest, and the motion vector information comprises:

a motion vector that indicates a relative position relationship between an image of the macroblock of the first frame of interest and an image of the macroblock of the first reference frame; and a vector residual that indicates a difference between the macroblock of the first frame of interest and the macroblock of the first reference frame corresponding to motion vector;

determine whether the macroblock of the first frame of interest is a target of development, based on the vector residual, wherein the development comprises signal processing on the RAW data;

generate a second frame of interest based on the development of the macroblock of the first frame of interest that is determined as the target of development; and generate a third frame of interest based on copy and composite of the macroblock of a second reference frame to a position of the macroblock of the first frame of interest that is determined as not being the target of development, wherein the macroblock of the second reference frame is copied and composited based on the motion vector.

5. A signal processing method, comprising:

dividing a first frame of interest of a video into a plurality of macroblocks, wherein the video comprises a plurality of frames of time series RAW data;

generating motion vector information between a macroblock of the first frame of interest and a macroblock of a firsts reference frame that corresponds to the macroblock of the first frame of interest, wherein the first reference frame is a frame preceding the first frame of interest, and the motion vector information comprises:

a motion vector that indicates a relative position relationship between an image of the macroblock of the first frame of interest and an image of the macroblock of the first reference frame; and a vector residual that indicates a difference between the macroblock of the first frame of interest and the macroblock of the first reference frame corresponding to motion vector;

determining whether the macroblock of the first frame of interest is a target of development, based on the vector residual, wherein the development comprises signal processing on the RAW data;

generating a second frame of interest based on the development of the macroblock of the first frame of interest that is determined as the target of development; and generating a third frame of interest based on copy and composite of a macroblock of a second reference frame to a position of the macroblock of the first frame of interest that is determined as not being the target of development, wherein the macroblock of the second reference frame is copied and composited based on the motion vector information.

6. The signal processing apparatus according to claim 1, wherein the circuitry is further configured to compare the vector residual with a threshold, and the determination whether the macroblock of the first frame of interest is the target of development is based on the comparison.

* * * * *